US012505773B2

(12) United States Patent
Wang et al.

(10) Patent No.: US 12,505,773 B2
(45) Date of Patent: Dec. 23, 2025

(54) GAMMA TUNING METHOD, APPARATUS, DEVICE, AND STORAGE MEDIUM

(71) Applicant: Yungu (Gu'an) Technology Co., Ltd., Hebei (CN)

(72) Inventors: Tiegang Wang, Langfang (CN); Haibin Jiang, Langfang (CN); Xiuning Shangguan, Langfang (CN); Tong Niu, Langfang (CN); Shuang Zhao, Langfang (CN)

(73) Assignee: Yungu (Gu'an) Technology Co., Ltd., Hebei (CN)

( * ) Notice: Subject to any disclaimer, the term of this patent is extended or adjusted under 35 U.S.C. 154(b) by 0 days.

(21) Appl. No.: 18/538,090

(22) Filed: Dec. 13, 2023

(65) Prior Publication Data

US 2024/0112615 A1 Apr. 4, 2024

Related U.S. Application Data

(63) Continuation of application No. PCT/CN2022/121918, filed on Sep. 27, 2022.

(30) Foreign Application Priority Data

May 10, 2022 (CN) ......................... 202210501278.1

(51) Int. Cl.
*G09G 3/20* (2006.01)

(52) U.S. Cl.
CPC ....... *G09G 3/20* (2013.01); *G09G 2320/0626* (2013.01); *G09G 2320/0673* (2013.01); *G09G 2360/16* (2013.01)

(58) Field of Classification Search
None
See application file for complete search history.

(56) References Cited

U.S. PATENT DOCUMENTS

2005/0200584 A1 9/2005 Kudo et al.
2017/0076656 A1 3/2017 Bang
(Continued)

FOREIGN PATENT DOCUMENTS

CN 109767722 A 5/2019
CN 110473499 A 11/2019
(Continued)

OTHER PUBLICATIONS

International Search Report issued Dec. 12, 2022, in corresponding International Application No. PCT/CN2022/121918, 6 pages.
(Continued)

*Primary Examiner* — Brian M Butcher
(74) *Attorney, Agent, or Firm* — Maier & Maier, PLLC

(57) ABSTRACT

A gamma tuning method, apparatus, device, and storage medium and belongs to the field of display technology. The method includes: selecting a plurality of different target dimming values, and correspondingly setting, for each of the target dimming values, a same voltage gamma max power and a same voltage gamma small power; for each of the target dimming values, obtaining a gamma register value for 0 gray scale under the target dimming value according to the voltage gamma max power, the voltage gamma small power, a maximum gamma register value, and a target voltage for 0 gray scale under the target dimming value; and writing the gamma register value for 0 gray scale under the target dimming value into a gamma register of the display panel.

14 Claims, 5 Drawing Sheets

(56) References Cited

U.S. PATENT DOCUMENTS

| | | | | |
|---|---|---|---|---|
| 2017/0169752 | A1 | 6/2017 | Kim et al. | |
| 2021/0110752 | A1* | 4/2021 | Kim | G09G 3/2092 |

FOREIGN PATENT DOCUMENTS

| | | | |
|---|---|---|---|
| CN | 111128077 | A | 5/2020 |
| CN | 111754914 | A | 10/2020 |
| CN | 111798799 | A | 10/2020 |
| CN | 111968580 | A | 11/2020 |
| CN | 112652262 | A | 4/2021 |
| CN | 113096583 | A | 7/2021 |
| CN | 114220377 | A | 3/2022 |
| CN | 114267316 | A | 4/2022 |
| CN | 114299895 | A | 4/2022 |
| CN | 114783346 | A | 7/2022 |
| KR | 1020070027872 | A | 3/2007 |
| KR | 1020160079318 | A | 7/2016 |
| WO | 2020191615 | A1 | 10/2020 |
| WO | 2021190158 | A1 | 9/2021 |
| WO | 2022001288 | A1 | 1/2022 |

OTHER PUBLICATIONS

Extended Search Report issued on Jul. 2, 2025, in corresponding European Application No. 22941437.0, 14 pages.

Office Action issued on Feb. 19, 2025, in corresponding Chinese Application No. 202210501278.1, 10 pages.

Notice of Allowance issued on Apr. 2, 2025, in corresponding Korean Application No. 10-2023-7043101, 8 pages.

* cited by examiner

GAMMA TUNING METHOD, APPARATUS, DEVICE, AND STORAGE MEDIUM

CROSS REFERENCE TO RELATED APPLICATION

The present application is a continuation of International Application No. PCT/CN2022/121918, filed on Sep. 27, 2022, which claims priority to Chinese Patent Application No. 202210501278.1 filed on May 10, 2022, both of which are incorporated herein by reference in theirs entireties.

TECHNICAL FIELD

The present application relates to the field of display technology, and particularly to a gamma tuning method, apparatus, device, and storage medium.

BACKGROUND

Voltage Gamma Max Power (VGMP) is the maximum value that can be provided by the display integrated circuit (IC) of the display panel in response to the data signal, i.e. the black state voltage. In order to reduce crosstalk, residual shadow and other undesirable phenomena of the display panel, different voltage gamma max powers may be set for different dimming values. Nonetheless, in the process of adjusting the dimming value from high to low, brightness reversal of the display panel corresponding to the same gray scale may occur, which affects the display effect of the display panel.

SUMMARY

Embodiments of the present application provide a gamma tuning method, apparatus, device, and storage medium, which can improve the display effect of the display panel.

In a first aspect, the embodiments of the present application provide a gamma tuning method, including: selecting a plurality of different target dimming values, and correspondingly setting, for each of the target dimming values, a same voltage gamma max power and a same voltage gamma small power; obtaining, for each of the target dimming values, a gamma register value for 0 gray scale under the target dimming value according to the voltage gamma max power, the voltage gamma small power, a maximum gamma register value, and a target voltage for 0 gray scale under the target dimming value, the target voltage being a minimum voltage value by which a display panel displays a black screen at 0 gray scale; and writing the gamma register value for 0 gray scale under the target dimming value into a gamma register of the display panel to cause the display panel to display according to the gamma register value for 0 gray scale.

In a second aspect, the embodiments of the present application provide a gamma tuning apparatus, including: a voltage setting module configured to select a plurality of different target dimming values, and correspondingly set, for each of the target dimming values, a same voltage gamma max power and a same voltage gamma small power; a calculation module configured to obtain, for each of the target dimming values, a gamma register value for 0 gray scale under the target dimming value according to the voltage gamma max power, the voltage gamma small power, a maximum gamma register value, and a target voltage for 0 gray scale under the target dimming value, the target voltage being a minimum voltage value by which a display panel displays a black screen at 0 gray scale; and a writing module configured to write the gamma register value for 0 gray scale under the target dimming value into a gamma register of the display panel to cause the display panel to display according to the gamma register value for 0 gray scale.

In a third aspect, the embodiments of the present application provide a gamma tuning device, including a processor and a memory storing computer program instructions; in which the processor implements the gamma tuning method of the first aspect when executing the computer program instructions.

In a fourth aspect, the embodiments of the present application provide a computer-readable storage medium storing computer program instructions thereon, in which the computer program instructions implement, when executed by a processor, the gamma tuning method of the first aspect.

The embodiments of the present application provide a gamma tuning method, apparatus, device, and storage medium, in which the voltage gamma max powers corresponding to a plurality of different target dimming values are set to be the same, and the voltage gamma small powers corresponding to a plurality of different target dimming values are set to be the same, so that when the dimming value changes, either the voltage gamma max power or the voltage gamma small power does not change. Since the voltage gamma max power and the voltage gamma small power do not change, brightness reversal of real-time display of the display panel due to a large precision step of the voltage gamma max power will not occur. Moreover, under a condition that the voltage gamma max power and the voltage gamma small power do not change with the dimming values, the gamma register value for 0 gray scale under the target dimming value is calculated and written into the gamma register corresponding to the display panel, so that the display panel can read the gamma register value when displays, and the gamma register value enables the display panel to generate the minimum voltage value by which to display a black screen at 0 gray scale under the target dimming value as the display data voltage for a sub-pixel with 0 gray scale. The difference between the voltages by which the display panel to display a black screen and a white screen is decreased, so as to reduce crosstalk, residual shadow and other undesirable phenomena, and further to reduce or even avoid the brightness reversal of the display panel corresponding to the same gray scale, the display effect of the display panel is improved.

DETAILED DESCRIPTION

Figure 1:
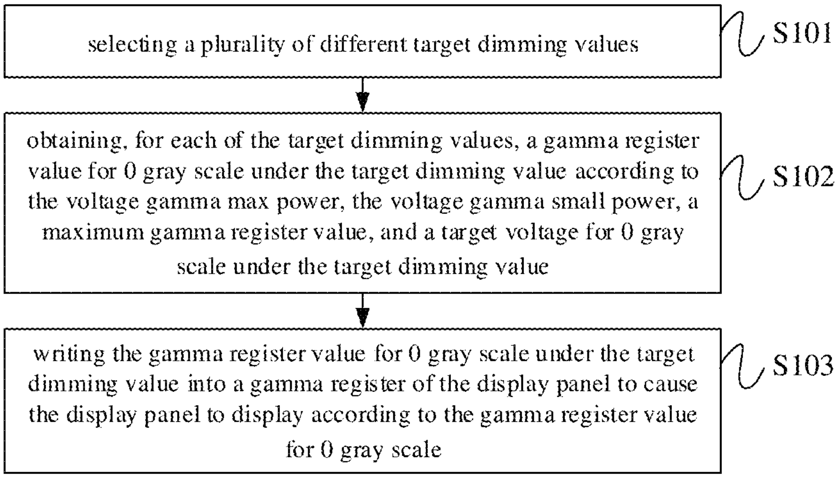
FIG. 1 shows a flowchart of a gamma tuning method according to an embodiment of the present application.

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only intended to explain the present application, but not to limit the present application. For those skilled in the art, the present application can be implemented without some of these specific details. The following description of the embodiments is only to provide a better understanding of the present application by illustrating examples of the present application.

During the display of the display panel, crosstalk, residual shadow and other undesirable phenomena may occur, which affect the display effect of the display panel. In order to reduce crosstalk, residual shadow and other undesirable phenomena, different voltage gamma max powers are set for different dimming values. The voltage gamma max power is the maximum value that can be provided by the display IC of the display panel in response to the data signal, i.e. the black state voltage. The voltage gamma max powers may be gradually decreased by the precision step of the voltage gamma max power that the display panel can handle in the order of the dimming values from high to low. In the process of adjusting the dimming value of the display panel from high to low after the voltage gamma max power being adjusted, the brightness of the display panel corresponding to the same gray scale should be gradually decreased, but since the precision step of the voltage gamma max power that the display panel can handle is large and difficult to be refined, brightness reversal of the display panel corresponding to the same gray scale may occur in the actual display. For example, the dimming value may be a 51 value, which is the display brightness value (DBV). For example, the display brightness value may be understood as the display brightness level, and taking a cell phone as an example, a brightness bar is provided on the cell phone, and different positions on the brightness bar may represent different display brightness values. Driving the integrated circuit in the display panel to adjust the brightness is carried out through the 51 register in the display panel, and the 51 value is the value of the 51 register and corresponding to the brightness bar for adjusting the brightness of the display panel. The voltage gamma max power is 7.4 V (i.e., volts) when the display brightness value is 4095, the voltage gamma max power is 6.8V when the display brightness value is 3000, the precision step of the voltage gamma max power that the display panel can handle between the two display brightness values is 0.006 V, and the voltage gamma max power is decreased for (7.4 V-6.8 V)/0.006 V=100 times in the process of decreasing the display brightness value from 4095 to 3000. If the change step of the display brightness value is 1, the voltage gamma max power is decreased once each time the display brightness value changes by (4095−3000)/100≈11 from display brightness value 4095 to display brightness value 3000, that is, in the process of adjusting the display brightness value from 4095 to 3000, the brightness reversal may occur once each time the display brightness value changes by 11. Brightness reversal refers to that the previous display brightness value is greater than the next display brightness value, but the actual brightness of the display panel at the previous display brightness value is lower than the actual brightness of the display panel at the next display brightness value.

The present application provides a gamma tuning method, apparatus, device, and storage medium, which can set the voltage gamma max power, the voltage gamma small power, and a specific gamma register value for 0 gray scale for the dimming value, so as to reduce crosstalk, residual shadow and other undesirable phenomena, and further to reduce or even avoid the brightness reversal of the display panel corresponding to the same gray scale, the display effect of the display panel is improved.

The gamma tuning method, apparatus, device, and storage medium provided by the present application will be described below.

The present application provides a gamma tuning method, which may be applied to a gamma tuning apparatus, a gamma tuning apparatus device, and the like, that is, the gamma tuning method may be performed by the gamma tuning apparatus, the gamma tuning apparatus device, and the like. FIG. 1 shows a flowchart of a gamma tuning method according to an embodiment of the present application. As shown in FIG. 1, the gamma tuning method may include steps S101 to S103.

In step S101, a plurality of different target dimming values are selected.

The target dimming values are specific dimming values selected from a plurality of dimming values, and the method and number for selecting the target dimming values are not limited herein. In the present application, the dimming value may include a display brightness value, i.e., DBV, which may be represented by a 51 value. A maximum value, a minimum value, and at least one dimming value between the maximum value and the minimum value in a range of dimming values may be selected as the target dimming values. For example, the dimming value is in a range of 0 to 4095, in which 0 and 4095 may be selected as the target dimming value, and at least one dimming value between 0 and 4095 may be selected as the target dimming value.

A voltage gamma max power and a voltage gamma small power (VGSP) are correspondingly set for each of the target dimming values. The voltage gamma max powers are the same for the target dimming values, and the voltage gamma small powers are the same for the target dimming values. That is, the voltage gamma max powers corresponding to the plurality of different target dimming values are the same, and the voltage gamma small powers corresponding to the plurality of different target dimming values are the same. For example, the plurality of target dimming values are A1, A2, A3, and A4, respectively, the voltage gamma max powers for the target dimming values A1, A2, A3, and A4 are $V_{max1}$, $V_{max2}$, $V_{max3}$, and $V_{max4}$, respectively, and the voltage gamma small powers for the target dimming values A1, A2, A3, and A4 are $V_{min1}$, $V_{min2}$, $V_{min3}$, $V_{min4}$, respectively, in which $V_{max1}=V_{max2}=V_{max3}=V_{max4}$, and $V_{min1}=V_{min2}=V_{min3}=V_{min4}$.

In step S102, a gamma register value for 0 gray scale under the target dimming value is obtained, for each of the target dimming values, according to the voltage gamma max power, the voltage gamma small power, a maximum gamma register value, and a target voltage for 0 gray scale under the target dimming value.

The gamma register value for 0 gray scale under the target dimming value may be obtained for each of the target dimming values according to step S102.

The target voltage is a minimum voltage value by which a display panel displays a black screen at 0 gray scale. The target voltage may be obtained experientially or by testing the display panel, which is not limited herein. The target voltage may be related to the screen material, manufacturing process, voltage gamma power, charging frequency, and other factors of the display panel. The voltage gamma max powers corresponding to the various target dimming values are the same, and the voltage gamma small powers corresponding to the various target dimming values are also the same, so that the unit values of the gamma resistor strings corresponding to the various target dimming values are equal. Under a condition that the unit values of the gamma resistor strings corresponding to the various target dimming values are equal, the voltage gamma max power, the voltage gamma small power, the maximum gamma register value, the target voltage for 0 gray scale under the target dimming value, and the gamma register value for 0 gray scale under the target dimming value are associated by a certain proportionality. In order that the display data voltage by which the display panel displays 0 gray scale under the target brightness is the target voltage, the gamma register value enables the display data voltage by which the display panel displays 0 gray scale under the target brightness to be the target voltage may be calculated using the voltage gamma max power, the voltage gamma small power, the maximum gamma register value, the target voltage, and the above proportionality among the parameters, and this gamma register value is the gamma register value for 0 gray scale under the target dimming value.

In step S103, the gamma register value for 0 gray scale under the target dimming value is written into a gamma register of the display panel to cause the display panel to display according to the gamma register value for 0 gray scale.

The gamma register value for 0 gray scale under the target dimming value calculated in step S102 may be written into the gamma register corresponding to the display panel. The display panel can read the gamma register value written into the gamma register when displays, and generate, according to the read gamma register value for 0 gray scale, the display data voltage for a sub-pixel with 0 gray scale in the display panel, and the corresponding sub-pixel is driven by the display data voltage to achieve the display of the display panel.

In the embodiments of the present application, the voltage gamma max powers corresponding to a plurality of different target dimming values are set to be the same, and the voltage gamma small powers corresponding to a plurality of different target dimming values are set to be the same, so that when the dimming value changes, either the voltage gamma max power or the voltage gamma small power does not change. Since the voltage gamma max power and the voltage gamma small power do not change, brightness reversal of real-time display of the display panel due to a large precision step of the voltage gamma max power will not occur. Moreover, under a condition that the voltage gamma max power and the voltage gamma small power do not change with the dimming values, the gamma register value for 0 gray scale under the target dimming value is calculated and written into the gamma register corresponding to the display panel, so that the display panel can read the gamma register value when displays, and the gamma register value enables the display panel to generate the minimum voltage value by which to display a black screen at 0 gray scale under the target dimming value as the display data voltage for a sub-pixel with 0 gray scale. The difference between the voltages by which the display panel to display a black screen and a white screen is decreased, so as to reduce crosstalk, residual shadow and other undesirable phenomena, and further to reduce or even avoid the brightness reversal of the display panel corresponding to the same gray scale, the display effect of the display panel is improved.

Figure 2:
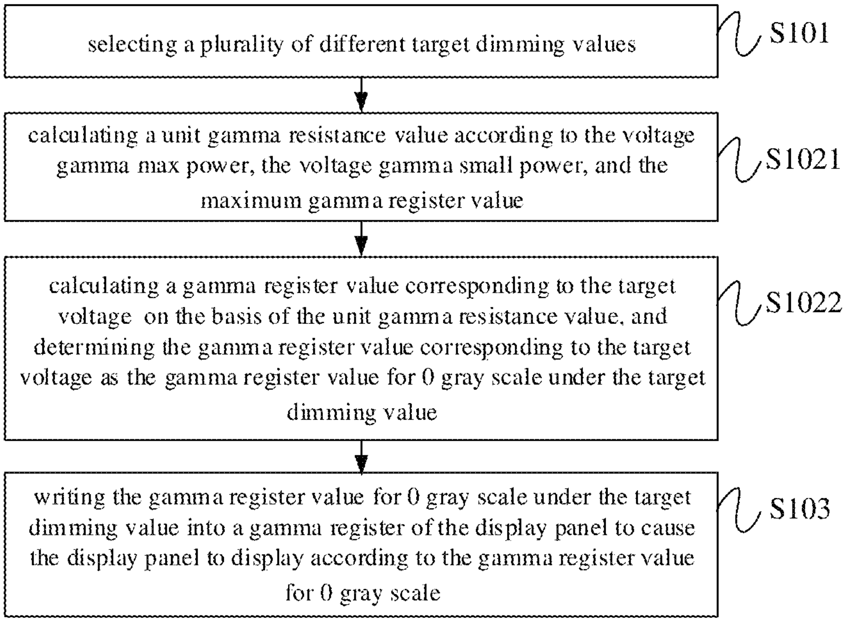
FIG. 2 shows a flowchart of a gamma tuning method according to another embodiment of the present application.

In some embodiments, a gamma resistance value corresponding to a unit value of the gamma register may be calculated first, and then the gamma resistance value corresponding to the unit value of the gamma register is utilized to calculate the gamma register value for 0 gray scale under the target brightness. FIG. 2 shows a gamma tuning method according to another embodiment of the present application. FIG. 2 differs from FIG. 1 in that step S102 in FIG. 1 may be specifically refined as steps S1021 and S1022 in FIG. 2.

In step S1021, a unit gamma resistance value is calculated according to the voltage gamma max power, the voltage gamma small power, and the maximum gamma register value.

The maximum gamma register value may be determined according to a bit number of the gamma register. For example, if the bit number of the gamma register is 12, the maximum gamma register value may be 4096. The unit gamma resistance value is corresponding to the unit value of the gamma register, and in the embodiments of the present application, the unit value of the gamma register may be 1. The unit gamma resistance value may be calculated by the following equation (1):

$$R=(V_{max}-V_{min})/G_m \quad (1)$$

where R is the unit gamma resistance value, $V_{max}$ is the voltage gamma max power, $V_{min}$ is the voltage gamma small power, and $G_m$ is the maximum gamma register value. The voltage gamma max power $V_{max}$ and the voltage gamma small power $V_{min}$ are voltages at both ends of the gamma resistor string, $(V_{max}-V_{min})/G_m$ means that the gamma resistor string is equally divided into $G_m$ portions, and the resistance of each portion is the unit gamma resistance value R. Herein, in order to facilitate the calculation, the maximum gamma register value $G_m$ is a decimal number, and if the maximum gamma register value is not a decimal number, it may be converted to a decimal number and then used to calculate the unit gamma resistance value.

In step S1022, a gamma register value corresponding to the target voltage is calculated on the basis of the unit gamma resistance value, and the gamma register value corresponding to the target voltage is determined as the gamma register value for 0 gray scale under the target dimming value.

Since the voltage gamma max powers under the various target dimming values are the same and the voltage gamma small powers under the various target dimming values are the same, the unit gamma resistance values corresponding to the various target dimming values are also the same. After the unit gamma resistance value is obtained, the gamma register value corresponding to the target voltage may be determined in combination with the voltage gamma max power and the target voltage.

In some examples, the voltage gamma max power $V_{max}$, the voltage gamma small power $V_{min}$, the maximum gamma register value $G_m$, the target voltage $V_0$, and the gamma register value X for 0 gray scale under the target dimming value may satisfy the following equation (2):

$$(V_{max}-V_{min})/G_m=(V_{max}-V_0)/X \quad (2)$$

For example, if the voltage gamma max power $V_{max}$=7.4 V, the voltage gamma small power $V_{min}$=1 V, the maximum gamma register value $G_m$=4096, and the target voltage $V_0$=6.8 V, according to the above equation (2), X=384.

The gamma register value X for 0 gray scale under the target dimming value may be a decimal number, and the decimal gamma register value X may be processed according to the requirement for the gamma register value in the display panel. For example, if the gamma register value is required to be a hexadecimal number in the display panel, the obtained decimal gamma register value X for 0 gray scale under the target dimming value may be converted to a hexadecimal number and then written into the gamma register of the display panel. The gamma register value X for 0 gray scale under the target dimming value is the register value that enables the display panel to generate the target voltage.

Figure 3:
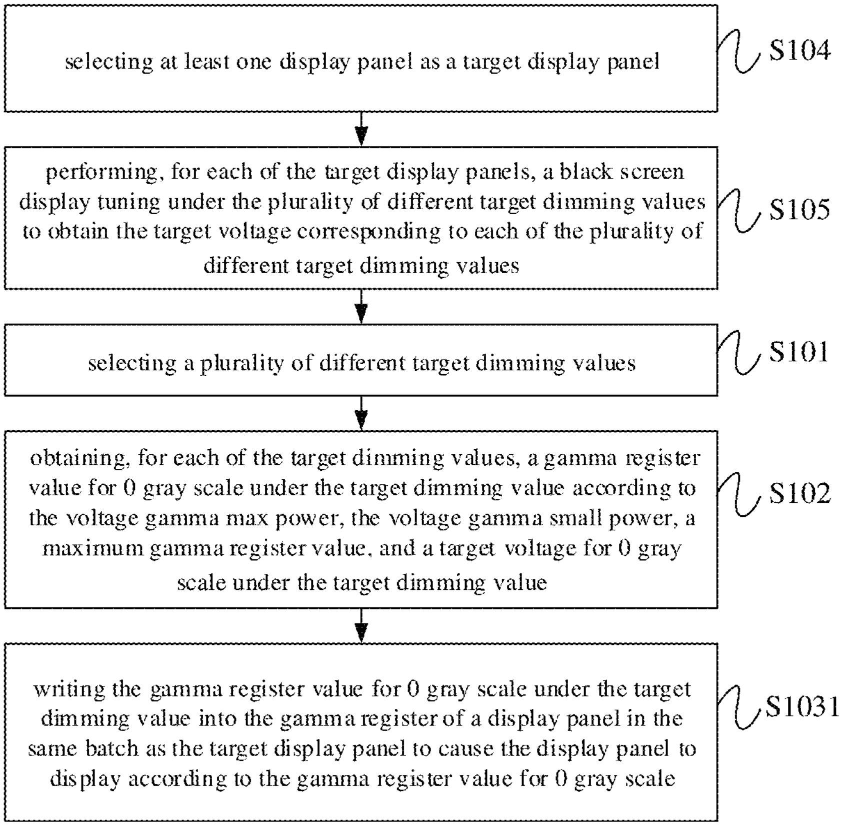
FIG. 3 shows a flowchart of a gamma tuning method according to yet another embodiment of the present application.

In some embodiments, at least one display panel may be selected from a batch of display panels and used to obtain the target voltage for 0 gray scale under the target dimming value, so that the gamma register value obtained based on the target voltage for 0 gray scale under the target dimming value may be applied to this batch of display panels. FIG. 3 shows a gamma tuning method according to yet another embodiment of the present application. FIG. 3 differs from FIG. 1 in that the gamma tuning method as shown in FIG. 3 may further include steps S104 and S105, and step S103 in FIG. 1 may be specifically refined as step S1031 in FIG. 3.

In step S104, at least one display panel is selected as a target display panel.

For a same batch of display panels that are subject to gamma tuning, at least one target display panel may be selected arbitrarily from this batch of display panels, or at least one target display panel may be selected according to a predetermined rule from this batch of display panels.

In step S105, a black screen display tuning under the plurality of different target dimming values is performed, for each of the target display panels, to obtain the target voltage corresponding to each of the plurality of different target dimming values.

The black screen display tuning under the plurality of different target dimming values may be performed for the selected target display panels. The black screen display tuning is a tuning in which the display panel displays a black screen, during which a minimum voltage value that enables the target display panel to display a black screen at 0 gray scale, i.e., the target voltage, may be obtained. The target voltage obtained in step S105 may be used in step S102 to obtain the gamma register value for 0 gray scale under the target dimming value.

Under a condition that the number of the target display panels is two or more, the target voltage for calculating the gamma register value in the above embodiments may be obtained using a weighting algorithm or other algorithms according to the target voltages of the two or more target display panels under the plurality of different target dimming values.

In some examples, the target display panels may include a display panel located at an edge of a display motherboard. The display motherboard herein is a display motherboard where the target display panels are located, and is cut to obtain a batch of display panels. In the manufacturing process, the display panel located at the edge of the display motherboard is more prone to effect than the display panel located at the center of the display motherboard, and thus the target voltage obtained based on the display panel located at the edge of the display motherboard has a greater compatibility and adaptability.

In step S1031, the gamma register value for 0 gray scale under the target dimming value is written into the gamma register of a display panel in the same batch as the target display panel to cause the display panel to display according to the gamma register value for 0 gray scale.

Since the manufacturing material and process are basically the same for a same batch of display panels, the target voltage obtained based on some of the batch of display panels may be applied to all display panels in the batch, and the black screen display tuning is not necessary for each of the same batch of display panels, the efficiency of gamma tuning for a large number of display panels in the same batch is improved.

In some embodiments, a program for implementing the gamma tuning method in the above embodiments is written into a gamma tuning apparatus, which may execute the gamma tuning method in the above embodiments. For a display panel in which the program for implementing the gamma tuning method in the above embodiments is not written into the display IC, the gamma tuning apparatus may be an apparatus independent of the display panel, such as a device fixture for gamma tuning. The gamma register value for 0 gray scale under the target dimming value is written, through the gamma tuning apparatus, into the corresponding gamma register for 0 gray scale in the display panel. During the operation of the display panel, the dynamic voltage gamma max power function of the display panel may be turned off, and the register value required for driving the sub-pixel at 0 gray scale is assigned directly according to the gamma register value written into the gamma register for 0 gray scale. The dynamic voltage gamma max power function gradually decreases the voltage gamma max power by the precision step of the voltage gamma max power that the display panel can handle in the order of the dimming values from high to low. Therefore, by writing the register value in the register for 0 gray scale under the target dimming value, during the display of the display panel, crosstalk, residual shadow and other undesirable phenomena can be reduced, and further the brightness reversal can be reduced or even avoided.

In some embodiments, the program for implementing the gamma tuning method in the above embodiments is written into the gamma tuning apparatus, which may execute the gamma tuning method in the above embodiments. For a display panel in which the program for implementing the gamma tuning method in the above embodiments has been written into the display IC, the gamma tuning apparatus may be the display IC of the display panel. There is a mapping (i.e., remapping) relationship between the gamma register value written into the gamma register and the target voltage, and thus by writing the register value in the register for 0 gray scale under the target dimming value, during the display of the display panel, crosstalk, residual shadow and other undesirable phenomena can be reduced, and further the brightness reversal can be reduced or even avoided.

Figure 4:
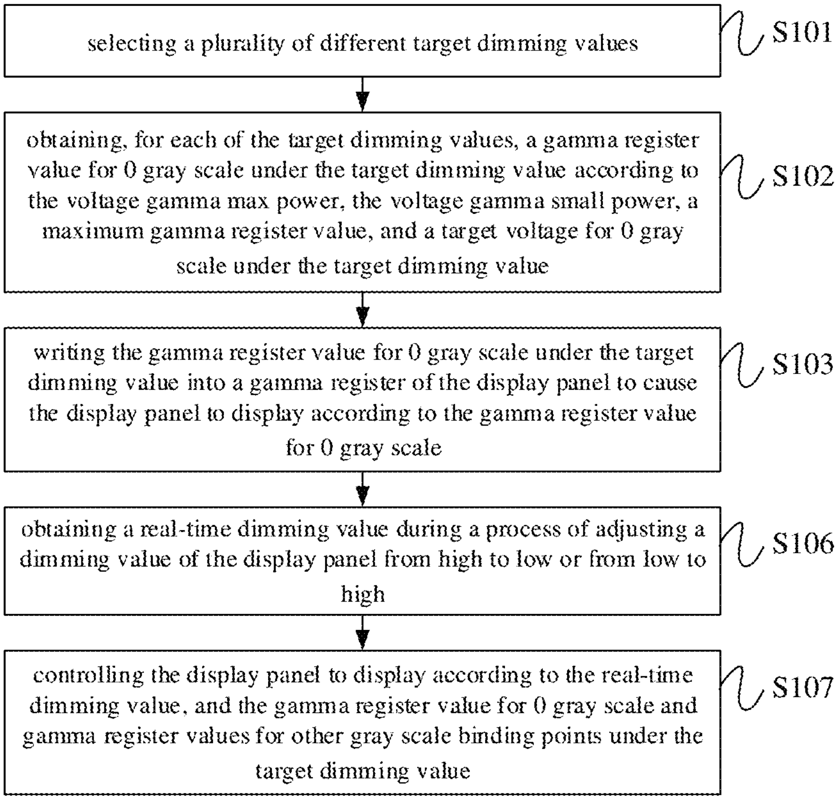
FIG. 4 shows a flowchart of a gamma tuning method according to yet another embodiment of the present application.

In some embodiments, the gamma tuning apparatus may be the display IC of the display panel, and under a condition that the dimming value of the display panel is adjusted, the display IC may control the display panel to display according to the written gamma register value for 0 gray scale under the target dimming value. FIG. 4 shows a gamma tuning method according to yet another embodiment of the present application. FIG. 4 differs from FIG. 1 in that the gamma tuning method as shown in FIG. 4 may further include steps S106 and S107.

In step S106, a real-time dimming value is obtained during a process of adjusting a dimming value of the display panel from high to low or from low to high.

The process of adjusting the dimming value of the display panel from high to low may be the process of a user dragging the brightness bar of the display panel from the bright end to the dark end, and the process of adjusting the dimming value of the display panel from low to high may be the process of the user dragging the brightness bar of the display panel from the dark end to the bright end. The real-time dimming value may be obtained during the process of adjusting the dimming value.

In step S107, the display panel is controlled to display according to the real-time dimming value, and the gamma register value for 0 gray scale and gamma register values for other gray scale binding points under the target dimming value.

According to a comparison between the real-time dimming value and the target dimming value, as well as the gamma register value for 0 gray scale and the gamma register values for the other gray scale binding points under the target dimming value, the gamma register value for 0 gray scale and the gamma register values for the other gray scale binding points under the real-time dimming value may be obtained and utilized to control the display panel to display.

The other gray scale binding points under the target dimming value are the gray scale binding points except 0 gray scale, and the selection of the gray scale binding points is not limited herein. The gamma register values for the other gray scale binding points under the target dimming value may be obtained by capturing the display brightness of the display panel with an optical capture device and adjusting the display brightness, which is not limited herein. For example, the display panel is controlled to display an image under the other gray scale binding points, and an actual display brightness of the display panel is captured with the optical capture device, the original gamma register values for the other gray scale binding points are adjusted according to a gamma mapping relationship characterizing a gray scale and a desired brightness, so that the actual display brightness of the display panel under the other gray scale binding points is the same as the desired brightness of the other gray scale binding points in the gamma mapping relationship, or a difference between the actual display brightness of the display panel under the other gray scale binding points and the desired brightness of the other gray scale binding points in the gamma mapping relationship is within an error threshold range, and the adjusted gamma register values for the other gray scale binding points are the gamma register values for the other gray scale binding points in the embodiments of the present application.

In some examples, under a condition that the real-time dimming value is the target dimming value, the display panel is controlled to display according to the gamma register value for 0 gray scale and the gamma register values for the other gray scale binding points under the target dimming value. If the real-time dimming value is the target dimming value, the gamma register value for 0 gray scale and the gamma register values for the other gray scale binding points under the target dimming value may be read directly. The gamma register value for a gray scale except the gray scale binding points may be obtained by an interpolation algorithm according to the gamma register values for two gray scale binding points adjacent to this gray scale.

In some examples, under a condition that the real-time dimming value is not the target dimming value, two of the target dimming values closest to the real-time dimming value are determined; a gamma register value for 0 gray scale under the real-time dimming value is obtained using an interpolation algorithm according to the gamma register values for 0 gray scale under the two target dimming values closest to the real-time dimming value; and the display panel is controlled to display according to the gamma register value for 0 gray scale and the gamma register values for the other gray scale binding points under the real-time dimming value. The gamma register value for a gray scale except the gray scale binding points may be obtained by an interpolation algorithm according to the gamma register values for two gray scale binding points adjacent to this gray scale.

The interpolation algorithm can use the values of a function at a finite number of points to estimate an approximate value of the function at other points. The interpolation algorithm may include, but is not limited to, linear interpolation, Lagrange interpolation, Newton interpolation, etc.

The gamma register value for a gray scale except the gray scale binding points may be estimated by the gamma register values taken by a function at two gray scale binding points. For example, if the simplest linear interpolation is utilized, the gamma register value for the gray scale binding point A1 is a1, and the gamma register value for the gray scale binding point A1+3 is a2, then the gamma register value for the gray scale binding point A1+1 is $a1+[(a2-a1)\times(A1+1-A1)/(A1+3-A1)]=a1+[(a2-a1)/3]$, and the gamma register value for the gray scale binding point A1+2 is $a1+[(a2-a1)\times(A1+2-A1)/(A1+3-A1)]=a1+[2(a2-a1)/3]$.

The gamma register value for 0 gray scale under the real-time dimming value may be estimated by the gamma register values for 0 gray scale taken by a function at two target dimming values closest to the real-time dimming value. For example, if the simplest linear interpolation is utilized, the two target dimming values closest to the real-time dimming value are B1 and B1+3, respectively, the gamma register value for 0 gray scale under the target dimming value B1 is b1, and the gamma register value for 0 gray scale under the target dimming value B1+3 is b2, then the gamma register value for 0 gray scale under the target dimming value B1+1 is $b1+[(b2-b1)\times(B1+1-B1)/(B1+3-B1)]=b1+[(b2-b1)/3]$, and the gamma register value for 0 gray scale under the target dimming value B1+2 is $b1+[(b2-b1)\times(B1+2-B1)/(B1+3-B1)]=b1+[2(b2-b1)/3]$.

The gray scales of various sub-pixels in an image displayed by the display panel may be different, and the gray scale of the sub-pixel is driven by the display data voltage, which is generated according to the gamma register value. Under a condition that the display panel needs to display an image, the gray scales of various sub-pixels in the image to be displayed may be obtained; according to the gray scales of the various sub-pixels, the gamma register values for the gray scales of the various sub-pixels under a real-time brightness are obtained; and based on the gamma register values for the gray scales of the various sub-pixels under the real-time brightness, the display data voltages for the various sub-pixels under the real-time brightness are generated to drive the sub-pixels in the display panel, so that the display panel displays the image under the real-time dimming value.

Figure 5:
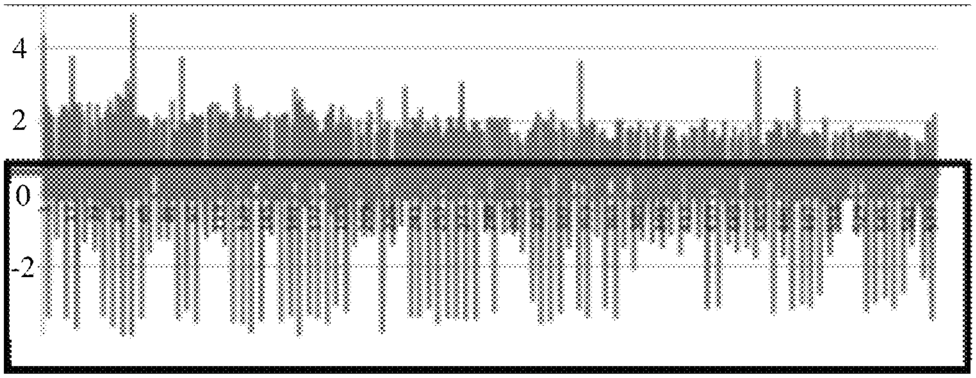
FIG. 5 shows a schematic diagram of exemplary brightness change of a display panel using a dynamic voltage gamma max power function.
Figure 6:
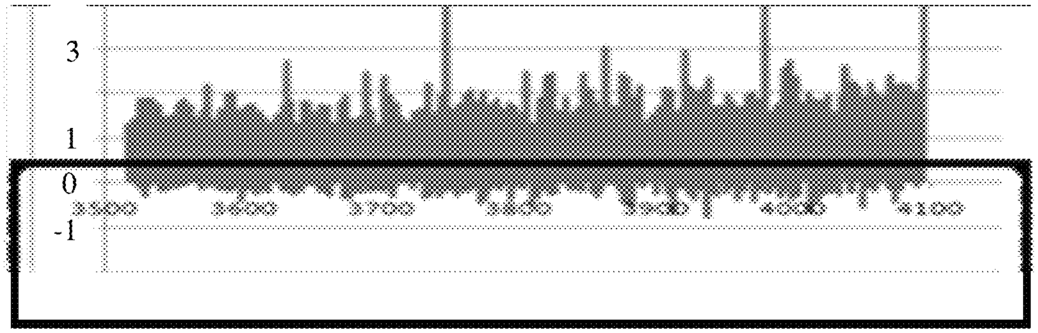
FIG. 6 shows a schematic diagram of exemplary brightness change of a display panel using the gamma tuning method of the embodiments of the present application.

With the gamma tuning method of the embodiments of the present application, brightness reversal of the display panel corresponding to the same gray scale can be greatly reduced. FIG. 5 shows the brightness change of a display panel using the dynamic voltage gamma max power function, which is described in the above embodiments. FIG. 6 shows the brightness change of a display panel using the gamma tuning method of the embodiments of the present application. In FIGS. 5 and 6, the horizontal coordinate is the 51 value, the vertical coordinate is a ratio between a brightness difference and a first brightness, the brightness difference is a difference between a second brightness and the first brightness, the first brightness is the display brightness of the display panel under a greater one of two adjacent 51 values, and the second brightness is the display brightness of the display panel under a smaller one of the two adjacent 51 values. Normally, the ratio between the brightness difference and the first brightness should be a positive value, but as shown in FIG. 5, in the process of adjusting the 51 value of the display panel, a large number of negative values appear for the ratio between the brightness difference and the first brightness, and the absolute values of the negative values are large. Nonetheless, as shown in FIG. 6, in the process of adjusting the 51 value of the display panel, a very small number of negative values appear for the ratio between the brightness difference and the first brightness, and the absolute values of the negative values are very small and negligible. As can be seen from a comparison between FIG. 5 and FIG. 6, the gamma tuning method of the embodiments of the present application can reduce crosstalk, residual shadow and other undesirable phenomena, and can further significantly reduce or even avoid the brightness reversal, the display effect of the display panel is improved.

Figure 7:
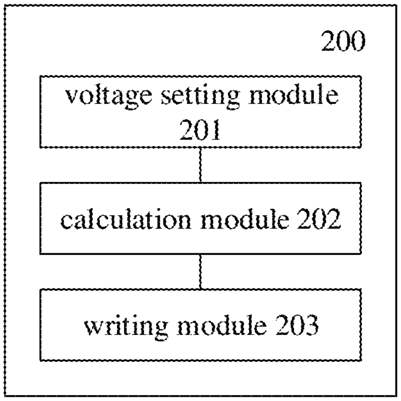
FIG. 7 shows a schematic structural diagram of a gamma tuning apparatus according to an embodiment of the present application.

The present application provides a gamma tuning apparatus. FIG. 7 shows a gamma tuning apparatus according to an embodiment of the present application. As shown in FIG. 7, the gamma tuning apparatus 200 may include a voltage setting module 201, a calculation module 202, and a writing module 203.

The voltage setting module 201 may be configured to select a plurality of different target dimming values.

A same voltage gamma max power and a same voltage gamma small power are correspondingly set for each of the target dimming values.

The calculation module 202 may be configured to obtain, for each of the target dimming values, a gamma register value for 0 gray scale under the target dimming value according to the voltage gamma max power, the voltage gamma small power, a maximum gamma register value, and a target voltage for 0 gray scale under the target dimming value.

The target voltage is a minimum voltage value by which a display panel displays a black screen at 0 gray scale.

The writing module 203 may be configured to write the gamma register value for 0 gray scale under the target dimming value into a gamma register of the display panel to cause the display panel to display according to the gamma register value for 0 gray scale.

In the embodiments of the present application, the voltage gamma max powers corresponding to a plurality of different target dimming values are set to be the same, and the voltage gamma small powers corresponding to a plurality of different target dimming values are set to be the same, so that when the dimming value changes, either the voltage gamma max power or the voltage gamma small power does not change. Since the voltage gamma max power and the voltage gamma small power do not change, brightness reversal of real-time display of the display panel due to a large precision step of the voltage gamma max power will not occur. Moreover, under a condition that the voltage gamma max power and the voltage gamma small power do not change with the dimming values, the gamma register value for 0 gray scale under the target dimming value is calculated and written into the gamma register corresponding to the display panel, so that the display panel can read the gamma register value when displays, and the gamma register value enables the display panel to generate the minimum voltage value by which to display a black screen at 0 gray scale under the target dimming value as the display data voltage for a sub-pixel with 0 gray scale. The difference between the voltages by which the display panel to display a black screen and a white screen is decreased, so as to reduce crosstalk, residual shadow and other undesirable phenomena, and further to reduce or even avoid the brightness reversal of the display panel corresponding to the same gray scale, the display effect of the display panel is improved.

In some embodiments, the calculation module 202 may be configured to: calculate a unit gamma resistance value according to the voltage gamma max power, the voltage gamma small power, and the maximum gamma register value, the unit gamma resistance value corresponding to a unit value of the gamma register; and calculate a gamma register value corresponding to the target voltage on the basis of the unit gamma resistance value, and determine the gamma register value corresponding to the target voltage as the gamma register value for 0 gray scale under the target dimming value.

In some examples, the maximum gamma register value may be determined according to a bit number of the gamma register.

In some embodiments, the voltage gamma max power $V_{max}$, the voltage gamma small power $V_{min}$, the maximum gamma register value $G_m$, the target voltage $V_0$, and the gamma register value X for 0 gray scale under the target dimming value satisfy: $(V_{max}-V_{min})/G_m=(V_{max}-V_0)/X$.

In some embodiments, the voltage setting module 201 may be configured: select a maximum value, a minimum value, and at least one dimming value between the maximum value and the minimum value in a range of dimming values as the target dimming values.

In some embodiments, the gamma tuning apparatus 200 may further include a driving module, which is configured to: read the gamma register value written into the gamma register during display of the display panel, and generate a display data voltage for a sub-pixel in the display panel with 0 gray scale according to the read gamma register value for 0 gray scale; and drive the sub-pixel with 0 gray scale in the display panel using the display data voltage.

Figure 8:
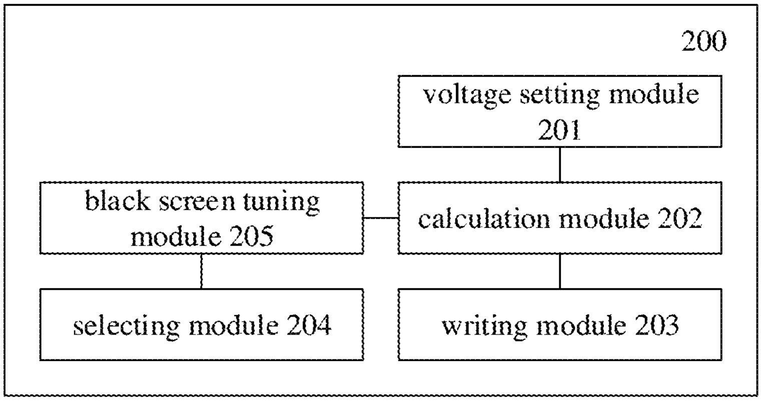
FIG. 8 shows a schematic structural diagram of a gamma tuning apparatus according to another embodiment of the present application.

FIG. 8 shows a gamma tuning apparatus according to another embodiment of the present application. FIG. 8 differs from FIG. 7 in that the gamma tuning apparatus 200 as shown in FIG. 8 may further include a selecting module 204 and a black screen tuning module 205.

The selecting module 204 is configured to select at least one display panel as a target display panel.

The black screen tuning module 205 may be configured to perform, for each of the target display panels, a black screen display tuning under the plurality of different target dimming values to obtain the target voltage corresponding to each of the plurality of different target dimming values.

In some examples, the target display panels include a display panel located at an edge of a display motherboard.

In some examples, the black screen tuning module 205 may be further configured to, under a condition that a number of the target display panels is two or more, obtain the target voltage for 0 gray scale under the target dimming value using a weighting algorithm according to the target voltages of the two or more target display panels under the plurality of different target dimming values.

In some embodiments, the gamma tuning apparatus 200 may include an apparatus independent of the display panel or the display integrated circuit of the display panel.

Figure 9:
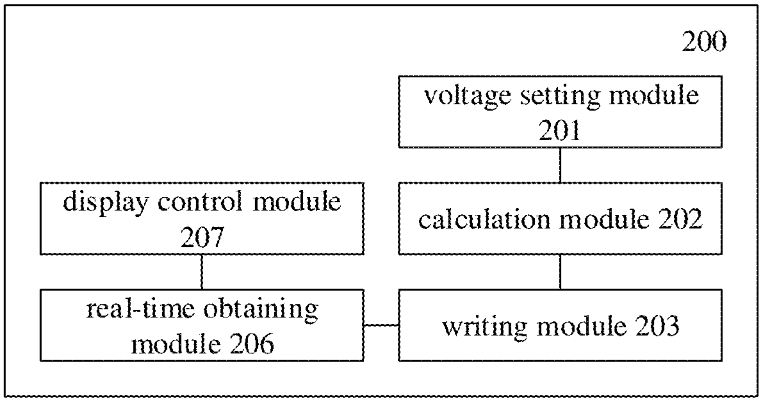
FIG. 9 shows a schematic structural diagram of a gamma tuning apparatus according to yet another embodiment of the present application.

In some embodiments, the gamma tuning apparatus 200 may include the display integrated circuit of the display panel. FIG. 9 shows a gamma tuning apparatus according to yet another embodiment of the present application. FIG. 9 differs from FIG. 7 in that the gamma tuning apparatus 200 as shown in FIG. 9 may further include a real-time obtaining module 206 and a display control module 207.

The real-time obtaining module 206 may be configured to obtain a real-time dimming value during a process of adjusting a dimming value of the display panel from high to low or from low to high.

The display control module 207 may be configured to control the display panel to display according to the real-time dimming value, and the gamma register value for 0 gray scale and gamma register values for other gray scale binding points under the target dimming value.

In some embodiments, the display control module 207 may be configured to: under a condition that the real-time dimming value is the target dimming value, control the display panel to display according to the gamma register value for 0 gray scale and the gamma register values for the other gray scale binding points under the target dimming value; and under a condition that the real-time dimming value is not the target dimming value, determine two of the target dimming values closest to the real-time dimming value; obtain a gamma register value for 0 gray scale under the real-time dimming value using an interpolation algorithm according to gamma register values for 0 gray scale under the two target dimming values closest to the real-time dimming value; and control the display panel to display according to the gamma register value for 0 gray scale and gamma register values for the other gray scale binding points under the real-time dimming value.

In some embodiments, the above gamma tuning apparatus 200 may further include a tuning module, which is configured to: control the display panel to display an image under the other gray scale binding points, and capture an actual display brightness of the display panel; adjust original gamma register values for the other gray scale binding points according to a gamma mapping relationship characterizing a gray scale and a desired brightness to obtain adjusted gamma register values, so that the actual display brightness of the display panel under the other gray scale binding points is the same as the desired brightness of the other gray scale binding points in the gamma mapping relationship, or a difference between the actual display brightness of the display panel under the other gray scale binding points and the desired brightness of the other gray scale binding points in the gamma mapping relationship is within an error threshold range; and determine the adjusted gamma register values as the gamma register values for the other gray scale binding points.

Figure 10:
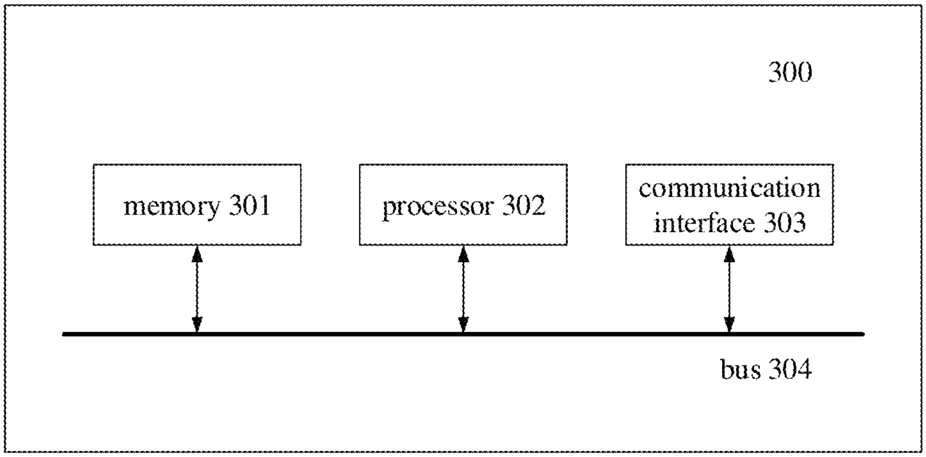
FIG. 10 shows a schematic structural diagram of a gamma tuning device according to an embodiment of the present application.

The present application further provides a gamma tuning device. FIG. 10 shows a schematic structural diagram of a gamma tuning device according to an embodiment of the present application. As shown in FIG. 10, the gamma tuning device 300 includes a memory 301, a processor 302, and a computer program which is stored in the memory 301 and can be executed in the processor 302.

In one example, the above processor 302 may include a central processing unit (CPU), or an Application Specific Integrated Circuit (ASIC), or one or more integrated circuits that may be configured to implement the embodiments of the present application.

The memory 301 may include a Read-Only Memory (ROM), a Random Access Memory (RAM), a disk storage media device, an optical storage media device, a flash memory device, and an electrical, optical, or other physical/tangible memory storage device. Therefore, generally, the memory includes one or more tangible (non-transitory) computer-readable storage media (e.g., memory devices) encoded with software including computer-executable instructions, and the software is operable, when executed (e.g., by one or more processors), to perform the operations described with reference to the gamma tuning method according to embodiments of the present application.

The processor 302 executes the computer program corresponding to an executable program code by reading the executable program code stored in the memory 301, so as to implement the gamma tuning method in the above embodiments.

In an example, the gamma tuning device 300 may further include a communication interface 303 and a bus 304. Herein, as shown in FIG. 10, the memory 301, the processor 302, and the communication interface 303 are connected and communicate with each other via the bus 304.

The communication interface 303 is mainly configured to achieve the communication among the various modules, apparatuses, units, and/or devices in the embodiments of the present application. Input devices and/or output devices may be further connected through the communication interface 303.

The bus 304 includes hardware, software, or both, to couple the components of the gamma tuning device 300 with each other. By way of example and not limitation, the bus 304 may include an Accelerated Graphics Port (AGP) or other graphics buses, an Enhanced Industry Standard Architecture (EISA) bus, a Front Side Bus (FSB), a Hyper Transport (HT) interconnect, an Industry Standard Architecture (ISA) bus, an infinite bandwidth interconnect, a Low pin count (LPC) bus, a memory bus, a Micro Channel Architecture (MCA) bus, a Peripheral Component Interconnect (PCI) bus, a PCI-Express (PCI-E) bus, a Serial Advanced Technology Attachment (SATA) bus, a Video Electronics Standards Association Local Bus (VLB) bus, or other suitable buses, or a combination thereof. If appropriate, the bus 304 may include one or more buses. Although specific buses are described and illustrated in the embodiments of the present application, the present application contemplates any suitable bus or interconnect.

The present application provides a computer-readable storage medium storing computer program instructions thereon, in which the computer program instructions may implement, when executed by a processor, the gamma tuning method in the above embodiments and can achieve the same technical effect, which is not repeated herein. Herein, the above computer-readable storage medium may include a non-transitory computer-readable storage medium, such as a Read-Only Memory (ROM), a Random Access Memory (RAM), a magnetic disk, or a compact disc, which is not limited herein.

The present application provides a computer program product including instructions, in which the instructions cause, when executed by a processor of an electronic device, the electronic device to execute the gamma tuning method in the above embodiments and can achieve the same technical effect, which is not repeated herein.

The present application provides a display panel, which may include the gamma tuning apparatus in the above embodiments, in which the gamma tuning apparatus can implement the gamma tuning method in the above embodiments, and the specific contents of the gamma tuning apparatus and the gamma tuning method may be referred to the relevant description in the above embodiments, and will not be repeated herein.

It should be noted that the various embodiments in the present specification are described in a progressive manner, the same or similar portions of the various embodiments can be referred to each other, and each embodiment focuses on the differences from other embodiments. For the apparatus embodiments, the device embodiments, the computer-readable storage medium embodiments, the computer program product embodiments, and the display panel embodiments, the relevant portions can be referred to the description of the method embodiments. The present application is not limited to the particular steps and structures described above and illustrated in the drawings. Those skilled in the art can make various changes, modifications, and additions, or change the order of the steps after understanding the gist of the present application. Moreover, detailed description of known methodological techniques is omitted herein for brevity.

Aspects of the present application are described above with reference to the flowchart and/or block diagram of the method, apparatus (system), and computer program product according to the embodiments of the present application. It should be understood that each block in the flowchart and/or block diagram and a combination of the blocks in the flowchart and/or block diagram may be implemented by computer program instructions. These computer program instructions may be provided to a processor of a general-purpose computer, a specialized computer, or other programmable data processing device to produce a machine, so that these instructions, executed by the processor of the computers or other programmable data processing device, enable the implementation of the function/action specified in one or more blocks of the flowchart and/or block diagram. Such a processor may be, but is not limited to, a general purpose processor, a specialized processor, a special application processor, or a field programmable logic circuit. It should also be understood that each block in the block diagram and/or flowchart and a combination of the blocks in the block diagram and/or flowchart may also be implemented by specialized hardware that performs specified function or action, or by a combination of specialized hardware and computer instructions.

What is claimed is:

1. A gamma tuning method, comprising:

selecting a plurality of different target dimming values, and correspondingly setting, for each of the target dimming values, a same voltage gamma max power and a same voltage gamma small power;

obtaining, for each of the target dimming values, a gamma register value for 0 gray scale under each of the target dimming values according to the voltage gamma max power, the voltage gamma small power, a maximum gamma register value, and a target voltage for 0 gray scale under each of the target dimming values, the target voltage being a minimum voltage value by which a display panel displays a black screen at 0 gray scale; and writing the gamma register value for 0 gray scale under each of the target dimming values into a gamma register of the display panel to cause the display panel to display according to the gamma register value for 0 gray scale;

wherein selecting the plurality of different target dimming values comprises:

selecting a maximum value, a minimum value, and at least one dimming value between the maximum value and the minimum value in a range of dimming values as the target dimming values.

2. The method of claim 1, wherein obtaining the gamma register value for 0 gray scale under each of the target dimming values according to the voltage gamma max power, the voltage gamma small power, the maximum gamma register value, and the target voltage for 0 gray scale under each of the target dimming values comprises:

calculating a unit gamma resistance value according to the voltage gamma max power, the voltage gamma small power, and the maximum gamma register value, the unit gamma resistance value corresponding to a unit value of the gamma register; and calculating a gamma register value corresponding to the target voltage on the basis of the unit gamma resistance value, and determining the gamma register value corresponding to the target voltage as the gamma register value for 0 gray scale under the target dimming value.

3. The method of claim 2, wherein the maximum gamma register value is determined according to a bit number of the gamma register.

4. The method of claim 2, wherein the voltage gamma max power $V_{max}$, the voltage gamma small power $V_{min}$, the maximum gamma register value $G_m$, the target voltage $V_0$, and the gamma register value X for 0 gray scale under the target dimming value satisfy:

$$(V_{max}-V_{min})/G_m=(V_{max}-V_0)/X.$$

5. The method of claim 1, further comprising, before for each of the target dimming values, obtaining the gamma register value for 0 gray scale under each of the target dimming values according to the voltage gamma max power, the voltage gamma small power, the maximum gamma register value, and the target voltage for 0 gray scale under each of the target dimming values:

selecting one or more display panels as one or more target display panels; and performing, for each of the one or more target display panels, a black screen display tuning under the plurality of different target dimming values to obtain the target voltage corresponding to each of the plurality of different target dimming values.

6. The method of claim 5, further comprising:

under a condition that a number of the one or more target display panels is two or more, obtaining the target voltage for 0 gray scale under each of the target dimming values using a weighting algorithm according to the target voltages of the two or more target display panels under the plurality of different target dimming values.

7. The method of claim 5, wherein the one or more target display panels comprise a display panel located at an edge of a display motherboard.

8. The method of claim 1, further comprising, after writing the gamma register value for 0 gray scale under each of the target dimming values into the gamma register of the display panel:

obtaining a real-time dimming value during a process of adjusting a dimming value of the display panel from high to low or from low to high; and controlling the display panel to display according to the real-time dimming value, and the gamma register value for 0 gray scale and gamma register values for other gray scale binding points under the target dimming value.

9. The method of claim 8, wherein controlling the display panel to display according to the real-time dimming value, and the gamma register value for 0 gray scale and the gamma register values for the other gray scale binding points under the target dimming value comprises:

under a condition that the real-time dimming value is one of the target dimming values, controlling the display panel to display according to the gamma register value for 0 gray scale and the gamma register values for the other gray scale binding points under the target dimming value; and under a condition that the real-time dimming value is not the target dimming value, determining two of the target dimming values closest to the real-time dimming value;

obtaining a gamma register value for 0 gray scale under the real-time dimming value using an interpolation algorithm according to gamma register values for 0 gray scale under the two target dimming values closest to the real-time dimming value; and controlling the display panel to display according to the gamma register value for 0 gray scale and gamma register values for the other gray scale binding points under the real-time dimming value.

10. The method of claim 8, further comprising:

controlling the display panel to display an image under the other gray scale binding points, and capturing an actual display brightness of the display panel;

adjusting original gamma register values for the other gray scale binding points according to a gamma mapping relationship characterizing a gray scale and a desired brightness to obtain adjusted gamma register values, so that the actual display brightness of the display panel under the other gray scale binding points is the same as the desired brightness of the other gray scale binding points in the gamma mapping relationship, or a difference between the actual display brightness of the display panel under the other gray scale binding points and the desired brightness of the other gray scale binding points in the gamma mapping relationship is within an error threshold range; and determining the adjusted gamma register values as the gamma register values for the other gray scale binding points.

11. The method of claim 9, further comprising:

controlling the display panel to display an image under the other gray scale binding points, and capturing an actual display brightness of the display panel;

adjusting original gamma register values for the other gray scale binding points according to a gamma mapping relationship characterizing a gray scale and a desired brightness to obtain adjusted gamma register values, so that the actual display brightness of the display panel under the other gray scale binding points is the same as the desired brightness of the other gray scale binding points in the gamma mapping relationship, or a difference between the actual display brightness of the display panel under the other gray scale binding points and the desired brightness of the other gray scale binding points in the gamma mapping relationship is within an error threshold range; and determining the adjusted gamma register values as the gamma register values for the other gray scale binding points.

12. The method of claim 1, further comprising, after writing the gamma register value for 0 gray scale under each of the target dimming values into the gamma register of the display panel to cause the display panel to display according to the gamma register value for 0 gray scale:

reading the gamma register value written into the gamma register during display of the display panel, and generating a display data voltage for a sub-pixel in the display panel with 0 gray scale according to the read gamma register value for 0 gray scale; and driving the sub-pixel with 0 gray scale in the display panel using the display data voltage.

13. A gamma tuning device, comprising a processor and a memory storing computer program instructions;

wherein the processor implements the gamma tuning method of claim 1 when executing the computer program instructions.

14. A non-transitory computer-readable storage medium storing computer program instructions thereon, wherein the computer program instructions implement, when executed by a processor, the gamma tuning method of claim 1.

* * * * *